(12) United States Patent
van Zanten et al.

(10) Patent No.: US 8,207,096 B2
(45) Date of Patent: Jun. 26, 2012

(54) COMPRESSIBLE PACKER FLUIDS AND METHODS OF MAKING AND USING SAME

(75) Inventors: Ryan van Zanten, Spring, TX (US); Douglas J. Harrison, Tomball, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 103 days.

(21) Appl. No.: 12/649,819

(22) Filed: Dec. 30, 2009

(65) Prior Publication Data
US 2011/0160103 A1 Jun. 30, 2011

(51) Int. Cl.
C09K 8/60 (2006.01)
C09K 8/64 (2006.01)
C09K 8/68 (2006.01)
C09K 8/528 (2006.01)
C09K 8/584 (2006.01)
C09K 8/54 (2006.01)
C23G 1/06 (2006.01)
E21B 43/22 (2006.01)
E21B 33/12 (2006.01)

(52) U.S. Cl. ........ 507/240; 507/203; 507/238; 507/242; 507/245; 507/258; 507/259; 507/265; 507/166; 507/267; 507/268; 166/270.1; 166/179

(58) Field of Classification Search ................. 507/240, 507/238, 203, 242, 245, 258, 259, 265, 266, 507/267, 268, 264; 166/270.1, 179
See application file for complete search history.

(56) References Cited

U.S. PATENT DOCUMENTS

| | | | |
|---|---|---|---|
| 4,223,732 A * | 9/1980 | Carriay et al. | 166/291 |
| 4,271,907 A * | 6/1981 | Gale | 166/270.1 |
| 4,695,389 A | 9/1987 | Kubala | |
| 4,706,749 A * | 11/1987 | Hayes et al. | 166/267 |
| 4,725,372 A | 2/1988 | Teot et al. | |
| 5,030,366 A | 7/1991 | Wilson et al. | |
| 5,309,999 A | 5/1994 | Cowan et al. | |
| 5,314,022 A | 5/1994 | Cowan et al. | |
| 5,340,860 A | 8/1994 | Brake et al. | |
| 5,361,842 A | 11/1994 | Hale et al. | |
| 5,373,901 A | 12/1994 | Norman et al. | |
| 5,515,921 A | 5/1996 | Cowan et al. | |
| 5,551,516 A | 9/1996 | Norman et al. | |
| 5,680,900 A | 10/1997 | Nguyen et al. | |
| 5,804,535 A | 9/1998 | Dobson et al. | |
| 5,879,699 A | 3/1999 | Lerner | |
| 5,979,555 A | 11/1999 | Gadberry et al. | |
| 5,996,692 A | 12/1999 | Chan et al. | |
| 6,063,737 A | 5/2000 | Haberman et al. | |
| 6,063,738 A | 5/2000 | Chatterji et al. | |
| 6,182,758 B1 | 2/2001 | Vijn | |
| 6,239,183 B1 | 5/2001 | Farmer et al. | |
| 6,283,213 B1 | 9/2001 | Chan | |
| 6,435,277 B1 | 8/2002 | Qu et al. | |
| 6,444,316 B1 | 9/2002 | Reddy et al. | |
| 6,506,710 B1 | 1/2003 | Hoey et al. | |
| 6,527,051 B1 | 3/2003 | Reddy et al. | |
| 6,547,871 B2 | 4/2003 | Chatterji et al. | |
| 6,554,071 B1 | 4/2003 | Reddy et al. | |
| 6,626,992 B2 | 9/2003 | Vijn et al. | |
| 6,831,043 B2 | 12/2004 | Patel et al. | |
| 6,881,709 B2 | 4/2005 | Nelson et al. | |
| 6,908,888 B2 | 6/2005 | Lee et al. | |
| 7,060,661 B2 | 6/2006 | Dobson, Sr. et al. | |
| 7,081,439 B2 | 7/2006 | Sullivan et al. | |
| 7,084,095 B2 | 8/2006 | Lee et al. | |
| 7,134,496 B2 | 11/2006 | Jones et al. | |
| 7,159,659 B2 | 1/2007 | Welton et al. | |
| 7,219,731 B2 | 5/2007 | Sullivan et al. | |
| 7,238,648 B2 | 7/2007 | Dahayanake et al. | |
| 7,244,694 B2 | 7/2007 | Fu et al. | |
| 7,279,446 B2 | 10/2007 | Colaco et al. | |
| 7,293,609 B2 | 11/2007 | Dealy et al. | |
| 7,299,874 B2 | 11/2007 | Welton et al. | |
| 7,303,019 B2 | 12/2007 | Welton et al. | |
| 7,320,952 B2 | 1/2008 | Chen et al. | |
| 7,341,980 B2 | 3/2008 | Lee et al. | |
| 7,380,606 B2 | 6/2008 | Pursley et al. | |
| 7,387,987 B2 | 6/2008 | Chen et al. | |
| 7,392,844 B2 | 7/2008 | Berry et al. | |
| 7,402,549 B2 | 7/2008 | Chen et al. | |
| 7,407,915 B2 | 8/2008 | Jones et al. | |
| 7,441,598 B2 | 10/2008 | Nguyen | |
| 7,493,957 B2 | 2/2009 | Nguyen et al. | |

(Continued)

FOREIGN PATENT DOCUMENTS
EP 0037699 B1 4/1985
(Continued)

OTHER PUBLICATIONS

Bloys, B., et al., "Trapped annular pressure—a spacer fluid that shrinks," SPE/IADC 104698, 2007, pp. 1-10, SPE/IADC Drilling Conference. Bloys, B., et al., "Trapped annular pressure mitigation: a spacer fluid that shrinks: update," IADC/SPE 112872, 2008, pp. 1-15, IADC/SPE Drilling Conference.
Gotch, Albert J., et al., "Formation of single-phase microemulsions in toluene/water/nonionic surfactant systems," Langmuir, 2008, pp. 4485-4493, vol. 24, No. 9, American Chemical Society.
Hellweg, Thomas, "Phase structures of microemulsions," Current Opinion in Colloid & Interface Science, 2002, pp. 50-56, vol. 7, Elsevier Science Ltd.
Kumar, Promod, et al., "Handbook of microemulsion science and technology," Jul. 21, 1999, 1 page, CRC.
Kunieda, Hironobu, et al., "Effect of added salt on the maximum solubilization in an ionic-surfactant microemulsion," Langmuir, 1996, pp. 5796-5799, vol. 12, No. 24, American Chemical Society.
Rosano, Henri L., et al., "Microemulsion systems," 1987, 1 page, M. Dekker.
Foreign communication from a related counterpart application—International Search Report and Written Opinion, PCT/GB2010/002342, Feb. 22, 2011, 11 pages.

(Continued)

Primary Examiner — John J Figueroa
Assistant Examiner — Atnaf Admasu
(74) Attorney, Agent, or Firm — Craig W. Roddy; Conley Rose, P.C.

(57) ABSTRACT

A method of servicing a wellbore comprising placing a composition comprising a surfactant, brine, an oleaginous fluid, and optionally a co-surfactant in an annular space of the wellbore, wherein the composition forms a microemulsion under low shear conditions.

26 Claims, 4 Drawing Sheets

U.S. PATENT DOCUMENTS

| | | | |
|---|---|---|---|
| 7,527,103 | B2 | 5/2009 | Huang et al. |
| 7,547,663 | B2 | 6/2009 | Kirsner et al. |
| 7,572,755 | B2 | 8/2009 | Miller et al. |
| 7,615,516 | B2 | 11/2009 | Yang et al. |
| 7,655,603 | B2 | 2/2010 | Crews |
| 7,776,796 | B2 | 8/2010 | Shapovalov et al. |
| 7,820,752 | B2 | 10/2010 | Bavouzet et al. |
| 7,833,950 | B2 | 11/2010 | Willberg et al. |
| 7,893,010 | B2 | 2/2011 | Ali et al. |
| 7,902,124 | B2 | 3/2011 | Ali et al. |
| 7,992,656 | B2 | 8/2011 | Dusterhoft et al. |
| 8,053,396 | B2 | 11/2011 | Huff et al. |
| 2006/0131536 | A1* | 6/2006 | Qu et al. .................. 252/62 |
| 2006/0183646 | A1 | 8/2006 | Welton et al. |
| 2007/0027253 | A1 | 2/2007 | Jones et al. |
| 2007/0281869 | A1 | 12/2007 | Drochon et al. |
| 2007/0284103 | A1 | 12/2007 | Dealy et al. |
| 2008/0076682 | A1 | 3/2008 | Jones et al. |
| 2008/0110618 | A1 | 5/2008 | Quintero et al. |
| 2008/0119374 | A1 | 5/2008 | Willberg et al. |
| 2008/0274918 | A1 | 11/2008 | Quintero et al. |
| 2008/0287324 | A1 | 11/2008 | Pursley et al. |
| 2008/0314592 | A1 | 12/2008 | Clark et al. |
| 2009/0008091 | A1 | 1/2009 | Quintero et al. |
| 2009/0111716 | A1 | 4/2009 | Hough et al. |
| 2009/0325826 | A1 | 12/2009 | Quintero et al. |
| 2010/0081586 | A1 | 4/2010 | Smith et al. |
| 2010/0263863 | A1 | 10/2010 | Quintero et al. |
| 2010/0300759 | A1 | 12/2010 | Passade-Boupat et al. |
| 2011/0048716 | A1 | 3/2011 | Ezell |
| 2011/0048718 | A1 | 3/2011 | Van Zanten et al. |
| 2011/0053812 | A1 | 3/2011 | Ezell et al. |

FOREIGN PATENT DOCUMENTS

| | | |
|---|---|---|
| EP | 2085448 A1 | 8/2009 |
| GB | 2032491 A | 5/1980 |
| GB | 2383355 A | 6/2003 |
| WO | 0142387 A1 | 6/2001 |
| WO | 02070862 A1 | 9/2002 |
| WO | 2006029019 A2 | 3/2006 |
| WO | 2006029019 A3 | 3/2006 |
| WO | 2006109016 A1 | 10/2006 |
| WO | 2008045734 A2 | 4/2008 |
| WO | 2008045734 A3 | 4/2008 |
| WO | 2009006251 A1 | 1/2009 |
| WO | 2009030868 A2 | 3/2009 |

OTHER PUBLICATIONS

Blauch, M. E., et al., "Testing and using surfactants in tight gas sand and unconventional gas reservoirs," SPE 27663, Mar. 1994, pp. 1-12, Society of Petroleum Engineers.

Crews, James B., et al., "New technology improves performance of viscoelastic surfactant fluids," SPE Drilling & Completion, Mar. 2008, pp. 41-47, Society of Petroleum Engineers.

Foreign communication from a related counterpart application—International Search Report and Written Opinion, PCT/GB2010/001630, Oct. 19, 2010, 11 pages.

Foreign communication from a related counterpart application—International Search Report and Written Opinion, PCT/GB2010/001631, Oct. 19, 2010, 12 pages.

Ingram, Stephen, et al., "Enhancing and sustaining well production: granite wash, Texas panhandle," SPE 106531, 2007, pp. 1-11, Society of Petroleum Engineers.

Massiera, G., et al., "The steric polymer layer of hairy wormlike micelles," Journal of Physics Condensed Matter, 2003, pp. S225-S231, vol. 15, Institute of Physics Publishing, Ltd., United Kingdom.

Massiera, Gladys, et al., "Hairy wormlike micelles: structure and interactions," Langmuir, 2002, pp. 5687-5694, vol. 18, No. 15, American Chemical Society.

Office Action dated Jul. 21, 2011 (34 pages), U.S. Appl. No. 12/551,334, filed Aug. 31, 2009.

Office Action dated Oct. 14, 2011 (24 pages), U.S. Appl. No. 12/827,451, filed Jun. 30, 2010.

Patent application entitled "Surfactant additives used to retain producibility while drilling," by Ryan Van Zanten, et al., filed Jun. 30, 2010 as U.S. Appl. No. 12/827,451.

Patent application entitled "Surfactant additives used to retain producibility while drilling," by Ryan van Zanten, et al., filed May 5, 2011 as U.S. Appl. No. 13/101,300.

Patent application entitled "Wellbore servicing fluids and methods of making and using same," by Ryan van Zanten, et al., filed Aug. 25, 2011 as U.S. Appl. No. 13/218,258.

Penny, Glenn, et al., "Microemulsion additives enable optimized formation damage repair and prevention," Journal of Energy Resources Technology, 2005, pp. 233-239, vol. 127, ASME.

Ramos, Laurence, et al., "Structure of a new type of transient network: entangled wormlike micelles bridged by telechelic polymers," Macromolecules, 2007, pp. 1248-1251, vol. 40, No. 4, American Chemical Society.

Samuel, M., et al., "A new solids-free non-damaging high temperature lost-circulation pill: development and first fieild applications," SPE 81494, 2003, pp. 1-12, Society of Petrolleum Engineers Inc.

Samuel, Mathew, et al., "Polymer-free fluid for hydraulic fracturing," SPE 38622, 1997, pp. 553-559, Society of Petroleum Engineers, Inc.

Schlumberger brochure entitled "ClearFRAC LT surfactant," www.slb.com/oilfield, Apr. 2005, 2 pages.

Van Zanten, Dissertation, University of California Santa Barbara, 2007, pp. 74-143.

Welton, Thomas D., et al., "Anionic surfactant gel treatment fluid," SPE 105815, 2007, pp. 1-8, Society of Petroleum Engineers.

Foreign communication from a related counterpart application—International Search Report and Written Opinion, PCT/GB2011/001136, Sep. 29, 2011, 12 pages.

Foreign communication from a related counterpart application—International Search Report and Written Opinion, PCT/GB2011/000988, Oct. 12, 2011, 11 pages.

Penny, G., et al., "The application of microemulsion additives in drilling and stimulation results in enhanced gas production," XP-002660084, SPE 94274, 2005, pp. 1-9, Society of Petroleum Engineers.

\* cited by examiner

COMPRESSIBLE PACKER FLUIDS AND METHODS OF MAKING AND USING SAME

BACKGROUND OF THE INVENTION

The present disclosure generally relates to wellbore servicing fluids. More particularly, this disclosure relates to packer fluids and methods of making and using same.

Annular fluids or packer fluids are liquids which are pumped into and reside in an annular space between a casing and a tubing wall, between adjacent concentric strings of pipe extending into a wellbore (e.g., a tubing-casing annulus) or into the bore of a cased wellbore. In the completion of oil and gas wells, packer fluids may be placed into an annulus between a casing and a production tubing (i.e., tubing-casing annulus) and positioned above a packer, specifically where the packer has been set to isolate production fluid from the tubing-casing annulus. Packer fluids, introduced into the tubing-casing annulus, fill the annular column to surface. Packer fluids are used (1) to provide hydrostatic pressure in order to lower differential pressure across the sealing element, (2) to lower differential pressure on the wellbore and casing to prevent collapse and (3) to protect metals and elastomers from corrosion.

There exist a number of drawbacks to the use of conventional packer fluids. For example, aqueous based packer fluids exhibit high density but water which is the main component of brines is considered an "incompressible" fluid. Further, aqueous based packer fluids will expand when heated, causing pressure to build up in the annulus. Non-aqueous based packer fluids are extremely compressible but are of low density. Such fluids can be weighted up by adding solids but these solids will settle over the time period that a packer fluid is in the annulus resulting in an inhomogeneous density profile. Therefore, there exists a continuing interest in developing novel packer fluids for use in wellbore servicing operations.

SUMMARY

Disclosed herein is a method of servicing a wellbore comprising placing a composition comprising a surfactant, brine, an oleaginous fluid, and optionally a co-surfactant in an annular space of the wellbore, wherein the composition forms a microemulsion under low shear conditions.

DETAILED DESCRIPTION

Figure 1:
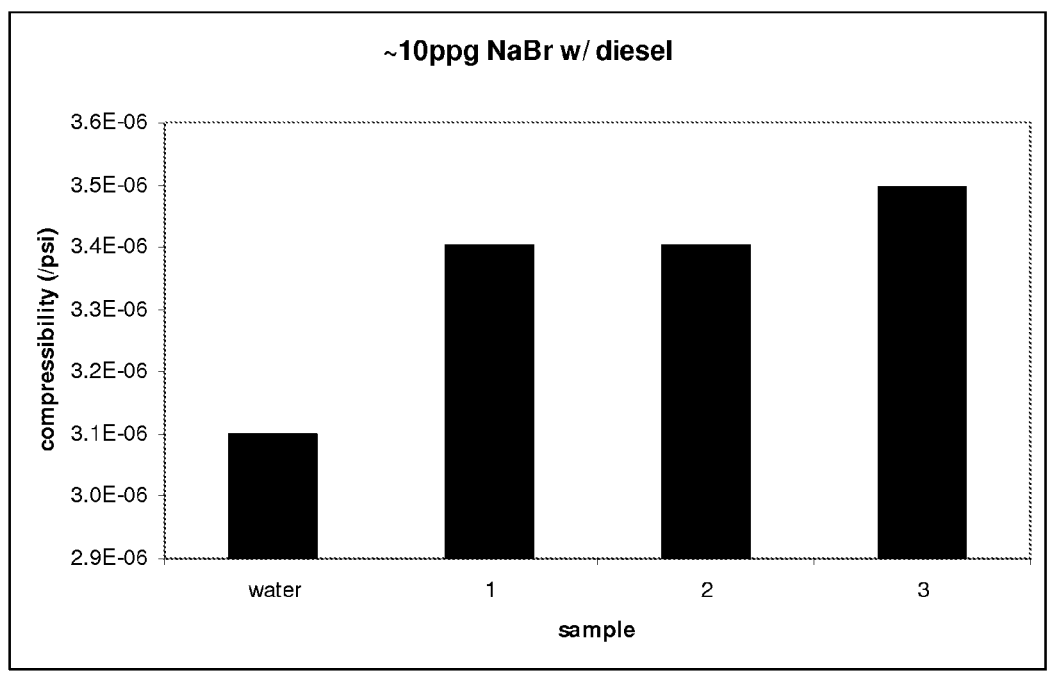
FIG. 1 is a graph of the compressibility of the samples containing sodium bromide from Example 1.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are packer fluids for use in servicing a wellbore and methods of making same. In an embodiment, the packer fluid comprises a microemulsion formed by a method comprising contacting brine, an oleaginous fluid, a surfactant (e.g., one or more zwitterionic surfactants, cationic surfactants, anionic surfactants, non-ionic surfactants, or combinations thereof) and optionally a cosurfactant. In an embodiment, a method of servicing a wellbore comprises placing a fluid comprising a microemulsion, formed from a composition comprising a brine, an oleaginous fluid, a surfactant and optionally a cosurfactant into an annular space of a wellbore. Microemulsions can consist of oil dispersed in water (OIW) or water dispersed in oil (WIO) emulsions, thermodynamically stabilized (in contrast to kinetically stabilized). The components of the microemulsion composition (MEC) as well as methods of making and using same will be described in more detail later herein.

In an embodiment, the MEC comprises one or more zwitterionic surfactants, cationic surfactants, anionic surfactants, non-ionic surfactants, or combinations thereof. Surfactants in general are wetting agents that lower the surface tension of a liquid in which they are dissolved, allowing easier spreading and decreasing the interfacial tension between two liquids. Each surfactant has a hydrophilic head that is attracted to water molecules and a hydrophobic tail that repels water and attaches itself to hydrophobic materials such as oil and grease.

In an embodiment, the MEC comprises a zwitterionic surfactant. Zwitterionic surfactants are electrically neutral surfactants that carry both a formal positive and a formal negative charge on different atoms in the same molecule. Such surfactants are characterized by a high solubility in water, low solubility in organic solvents, and increased stability at higher temperatures when compared to other types of surfactants (e.g., non-ionic surfactants).

Examples of zwitterionic surfactants suitable for use in this disclosure include without limitation alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, or combinations thereof.

In an embodiment, the zwitterionic surfactant comprises an amine oxide. Amine oxides, also termed amine N-oxides or N-oxides, are chemical compounds that comprise the functional group $R_3N^+$—O— where R may be an alkyl moiety having from 1 to 20 carbon atoms. The term amine oxide herein is meant to comprise oxides of tertiary amines including nitrogen containing aromatic compounds, analogous primary or secondary amines, derivatives thereof, or combinations thereof. Examples of amine oxides suitable for use in this disclosure include without limitation decylamine oxide, dodecylamine oxide, tetradecylamine oxide, or combinations thereof.

In an embodiment, the zwitterionic surfactant comprises a betaine. Betaines are neutral chemical compounds comprising a positively charged cationic functional group and no hydrogen atom and a negatively charged functional group that may not be adjacent to the cationic site. For example, a betaine may comprise an onium ion (e.g., ammonium, phosphonium) and a carboxylate group. Examples of betaines suitable for use in this disclosure include without limitation laurylamidopropyl betaine, decyl betaine, dodecyl betaine, or combinations thereof.

In an embodiment, the zwitterionic surfactant comprises a phospholipid. Phospholipids are similar in structure to triglycerides with the exception that the first hydroxyl of the glycerine molecule has a polar phosphate containing group in place of the fatty acid. The hydrocarbon chain of the phospholipid is hydrophobic while the charges on the phosphate groups make that portion of the molecule hydrophilic resulting in an amphiphilic molecule. Examples of phospholipids suitable for use in this disclosure include without limitation lecithin, phosphatidyl choline, derivatives thereof, or combinations thereof.

In an embodiment, the zwitterionic surfactant may be present in the MEC in an amount of from about 0.5 weight percent (wt. %) to about 90 wt. % based on the total weight percentage of the MEC, alternatively from about 10 wt. % to about 90 wt. %, alternatively from about 20 wt. % to about 80 wt. %, alternatively from about 30 wt. % to about 70 wt. %.

In an embodiment, the MEC comprises a cationic surfactant. Herein a cationic surfactant has a positively charged head and a hydrophobic tail comprising a carbon chain. A cationic surfactant suitable for use in this disclosure may have a carbon chain having a length of from about 8 to about 24, alternatively from about 8 to about 18, alternatively from about 12 to about 22, alternatively from about 16 to about 24. Examples of cationic surfactants suitable for use in this disclosure include without limitation quaternary ammonium salts, ethoxylated quaternary ammonium salts, amine oxides, or a combination thereof. In an embodiment, the cationic surfactant comprises stearyltrimethylammonium chloride, cetyltrimethylammonium tosylate, cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, octyltrimethylammonium chloride, erucyl bis-(hydroxy ethyl)methylammonium chloride, erucyltrimethylammonium chloride, or a combination thereof.

In an embodiment, the cationic surfactant may be present in the MEC in an amount of from about 0.5 wt. % to about 90 wt. % based on the total weight of the MEC, alternatively from about 10 wt. % to about 90 wt. %, alternatively from about 20 wt. % to about 80 wt. %, alternatively from about 30 wt. % to about 70 wt. %.

In an embodiment, the MEC comprises an anionic surfactant. Herein an anionic surfactant has a negatively charged head and a hydrophobic tail comprising a carbon chain. An anionic surfactant suitable for use in this disclosure may have carbon chain having a length of from about 8 to about 24, alternatively from about 8 to about 18, alternatively from about 12 to about 22, alternatively from about 18 to about 24. Examples of anionic surfactants suitable for use in this disclosure include without limitation alkali salts of acids, alkali salts of fatty acids, alkaline salts of acids, sodium salts of acid, sodium salts of fatty acid, alkyl sulphates, alkyl ethoxylate, sulphates, sulfonates, soaps, or a combination thereof. In an embodiment, the anionic surfactant comprises sodium oleate, sodium stearate, sodium dodecylbenzenesulfonate, sodium myristate, sodium laurate, sodium decanoate, sodium caprylate, sodium cetyl sulfate, sodium myristyl sulfate, sodium lauryl sulfate, sodium decyl sulfate, sodium octyl sulfate, or a combination thereof.

In an embodiment, the anionic surfactant may be present in the MEC in an amount of from about 0.5 wt. % to about 90 wt. % based on the total weight of the MEC, alternatively from about 10 wt. % to about 90 wt. %, alternatively from about 20 wt. % to about 80 wt. %, alternatively from about 30 wt. % to about 70 wt. %.

In an embodiment, the MEC comprises a non-ionic surfactant. Herein a nonionic surfactant has an uncharged hydrophilic head and a hydrophobic tail comprising a carbon chain. A non-ionic surfactant suitable for use in this disclosure may have carbon chain having a length of from about 8 to about 24, alternatively from about 8 to about 18, alternatively from about 12 to about 22, alternatively from about 18 to about 24. Examples of nonionic surfactants suitable for use in this disclosure include without limitation linear alcohol ethoxylates, polyoxyethylene alkylphenol ethoxylates, polyoxyethylene alcohol ethoxylates, polyoxyethylene esters of fatty acids, polyoxyethylene mercaptans, polyoxyethylene alkylamines, polyol ester surfactants, or a combination thereof.

In an embodiment, the nonionic surfactant may be present in the MEC in an amount of from about 0.5 wt. % to about 90 wt. % based on the total weight of the MEC, alternatively from about 10 wt. % to about 90 wt. %, alternatively from about 20 wt. % to about 80 wt. %, alternatively from about 30 wt. % to about 70 wt. %.

In an embodiment, the MEC comprises a co-surfactant. Generally, co-surfactants are materials that synergistically act with the surfactant to reduce the interfacial tension between two liquids. In an embodiment, the co-surfactant comprises any material compatible with the other components of the MEC that does not self-assemble or self-aggregate. Examples of co-surfactants suitable for use in this disclosure include without limitation alkyl alcohols (e.g., methanol, ethanol, propanol, butanol, etc.), alkyl acetate, alkyl pyrollidone (e.g., noctyl-2-pyrollidone, n-methyl pyrollidone, etc.), alkyl ketone, acryl amide, organic salts, or combinations thereof. In an embodiment, the co-surfactant comprises butanol. In another embodiment, the cosurfactant comprises n-octyl-2-pyrollidone.

In an embodiment, the co-surfactant may be present in the MEC in an amount of from about 0.5 wt. % to about 90 wt. % based on the total weight percentage of the MEC, alternatively from about 10 wt. % to about 90 wt. %, alternatively from about 20 wt. % to about 80 wt. %, alternatively from about 30 wt. % to about 70 wt. %.

In an embodiment, the surfactant:co-surfactant mole ratio is from about 1:10 to about 10:1, alternatively from about 1:5 to about 5:1, alternatively from about 1:0.1 to about 0.1:1. In an embodiment, the surfactant:co-surfactant ratio is chosen so as to prevent phase separation and provide a single phase microemulsion when contacted with the brine and an oleaginous fluid. Furthermore, the surfactant:co-surfactant mole ratio may be chosen so as prevent precipitation of one or more components of the MEC.

In an embodiment, the MEC comprises one or more brines. Brines are aqueous fluids that are typically saturated or nearly saturated with salt. In an embodiment, the MEC comprises a brine that is a saturated aqueous solution of one or more salts. In an embodiment, the MEC comprises a brine that comprises one or more salts at a concentration below saturation such that the brine contains some amount of free water. In an embodiment, an MEC of the type described herein may comprise any brine solution compatible with the other components of the MEC and the intended function of the MEC.

Examples of brines suitable for use in this disclosure include without limitation saturated or partially saturated aqueous solutions comprising halide-containing salts, alkali metal salts, alkaline metal salts, formate-containing compounds, sodium bromide (NaBr), calcium chloride ($CaCl_2$), calcium bromide ($CaBr_2$), ammonium chloride, sodium chloride (NaCl), potassium chloride, zinc bromide (ZnBr$_2$), ethyl formate, sodium formate, cesium formate, potassium formate, methyl formate, methyl chloro formate, triethyl orthoformate, trimethyl orthoformate, derivatives thereof, or combinations thereof.

In some embodiments, the MEC comprises brine prepared from a mixture of two or more salts. In such embodiments, the brine mixture may be formed by contacting the constituent brines in any ratio compatible with their intended use. The choice of brine may be dictated by a variety of factors such as the formation condition and the desired density of the resulting solution.

In an embodiment, the brine comprises a saturated or partially saturated aqueous solution containing NaBr, alternatively CaCl$_2$, alternatively ZnBr$_2$, alternatively a mixture of CaCl$_2$/CaBr$_2$. In an embodiment, the brine may have a density of from about 8.5 ppg to about 19.2 ppg, alternatively from about 8.5 ppg to about 15.0 ppg alternatively from about 8.5 ppg to about 12.5 ppg, alternatively form about 10.5 ppg to about 11.6 ppg.

In an embodiment, the brine may be present in the MEC in an amount of from about 10 wt. % to about 98 wt. % based on the total weight of the MEC, alternatively from about 10 wt. % to about 90 wt. %, alternatively from about 20 wt. % to about 80 wt. %, alternatively from about 30 wt. % to about 70 wt. %.

In an embodiment, the MEC comprises one or more oleaginous fluids. Oleaginous fluids herein refer to fluids comprising substantially no aqueous component. Examples of the oleaginous fluids suitable for use in this disclosure include without limitation hydrocarbons, olefins, internal olefin based oils, mineral oil, kerosene, diesel oil, fuel oil, synthetic oil, linear or branched paraffins, esters, acetals, mixtures of crude oil, derivatives thereof, or combinations thereof.

In an embodiment, the oleaginous fluid may be present in the MEC in an amount of from about 1 wt. % to about 90 wt. % based on the total weight of the MEC, alternatively from about 10 wt. % to about 80 wt. %, alternatively from about 20 wt. % to about 70 wt. %.

The microemulsions of this disclosure (i.e., MECs) are further characterized as being thermodynamically stable mixtures of oil, water (e.g., brine), surfactant, and optional cosurfactant. Herein the stability of the composition refers to the ability of the composition to resist phase separation. Conventional emulsions are only kinetically stabilized; thus over time the oil and water phases will separate via a combination of coalescence and Ostwald ripening mechanisms. Such phase separations will be especially prominent in elevated temperature environments and over the extended time periods, which a packer fluid would experience. In an embodiment, the MECs of this disclosure remain stable for a duration of time equivalent to the chemical stability of the MEC constituents.

Furthermore, in contrast to conventional emulsions, the compositions of this disclosure (i.e., MECs) form spontaneously or almost spontaneously upon contacting of the components under low shear conditions which are in contrast to the conditions (e.g., high shear) generally used in the formation of conventional emulsions.

In order for an emulsion to form spontaneously, there must be a reduction in the free energy of the system. Without wishing to be limited by theory, this reduction in free energy is brought about by an increase in conformational entropy, a reduction in surface tension, a decrease in curvature energy, or combinations thereof. The free energy change of a system is represented by the following equation 1 or 2:

$$\Delta G = \Delta H - T\Delta S \quad \text{Equation 1}$$

$$\Delta G = \Delta A \cdot \gamma_{ow} - T\Delta S \quad \text{Equation 2}$$

where G is the Gibbs free energy, T is the temperature, S is the entropy, A is the interfacial area, and $\gamma$ is the interfacial tension at the oil-water interface. The entropy is increased by the creation of several small droplets; however, the creation of these droplets also causes a large increase in the oil/water interfacial area. The amount of surface area created is enormous, generating a large energy penalty from contacting oil/water. This energy penalty must be reduced by the addition of surfactants which lower the interfacial tension, thus reducing the amount of energy needed to form an interface. Generally emulsification is a non-spontaneous process such that $\Delta A \cdot \gamma_{ow} \gg T\Delta S$. However, the amount of thermodynamic energy required to create the new interface ($\Delta A \cdot \gamma_{ow}$) is small when compared with the amount of energy that is required to form a conventional emulsion. The additional energy required is due to the interfacial curvature. The energy required to change the interfacial curvature can be represented by the following equation 3:

$$F = \int dA \cdot \{(\kappa/2)(c_1+c_2-2c_0)^2 - \bar{\kappa} c_1 c_2\} + NkTf(\Phi) \quad \text{Equation 3}$$

where $\kappa$ is the bending modulus, $\kappa$ bar is the Gaussian modulus, $c_1$ and $c_2$ are the radii of curvature, $c_0$ is the spontaneous curvature and $NkTf(\Phi)$ is entropic in origin. The addition of an optional co-surfactant to the system reduces the $\kappa$ term, thus reducing the energy required to produce a curved surfactant film at the oil/water interface.

In an embodiment, a microemulsion is formed by contacting a surfactant, brine, an oleaginous fluid, and optionally a co-surfactant to form an MEC. Contacting of the MEC components may be carried out using any suitable technique (e.g., mixing, blending, etc.) and under any suitable conditions. In some embodiments, contacting the MEC components to form a microemulsion is carried out under mild agitation (e.g., magnetic agitation, mechanical agitation, ultrasound).

In some embodiments, contacting the MEC components to form a microemulsion is carried out under low shear conditions. Herein low shear conditions refer to the ability of the MEC to form an oil-in-water (OIW) emulsion in the absence of substantial agitation.

In an embodiment, a MEC of the type described herein is able to form an OIW microemulsion spontaneously. Without wishing to be limited by theory, formation of the OIW microemulsion may be spontaneous and correspondingly have a Gibbs free energy of equal to or less than about 0.

A MEC of the type described herein suitable for use as a packer fluid may be further characterized as solids free. Herein, solids free refers to the amount of solids present in the MEC being equal to or less than about 3 wt. %, alternatively equal to or less than about 2 wt. %, alternatively equal to or less than about 1 wt. % based on the total weight of the MEC. Examples of solids include without limitation particles, sands, formation materials, weighting agents, or a combination thereof.

In an embodiment, the MEC of this disclosure may have a compressibility of from about 3.2E-6 psi$^{-1}$ to about 1.5E-5 psi$^{-1}$, alternatively from about 3.5E-6 psi$^{-1}$ to about 1E-5 psi$^{-1}$, alternatively from about 3.5E-6 psi$^{-1}$ to about 9E-6 psi$^{-1}$ at 77° F. In an embodiment, the MEC of this disclosure may have a compressibility of from about 3.0E-6 psi$^{-1}$ to about 2.0E-5 psi$^{-1}$, alternatively from about 3.0E-6 psi$^{-1}$ to about 1E-5 psi$^{-1}$ alternatively from about 3.5E-6 psi$^{-1}$ to about 9E-6 psi$^{-1}$ at 120° F.

Compressibility herein is defined by the following equation 4:

$$\beta = -\frac{1}{V}\left(\frac{\partial V}{\partial P}\right) \quad \text{Equation 4}$$

where β is compressibility, V is volume and P is pressure.

MECs of the type described herein may exhibit thermal stability as assessed by their ability to form microemulsions and maintain a single phase while statically aged at a temperature of from about 65° F. to about 400° F., alternatively from about 70° F. to about 200° F., alternatively from about 75° F. to about 120° F. for a period of from about 1 hour to about 30 days, alternatively from about 1 hour to about 15 days, alternatively from about 1 hour to about 240 hours, alternatively from about 1 hours to about 120 hours, alternatively from about 1 hours to about 24 hours.

In an embodiment, the MECs of this disclosure may further comprise one or more viscosifiers that serve to increase the viscosity of the MEC. Examples of viscosifiers suitable for use in this disclosure include without limitation water soluble polymers such as cellulosics, acrylates, styrenics, acrylamides. In an embodiment, MECs of this disclosure comprising a viscosifier may have a dynamic viscosity of from about 0.001 Pa·s to about 10E6 Pa·s, alternatively from about 0.1 Pa·s to about 10E5 Pa·s, alternatively from about 1 Pa·s to about 10E4 Pa·s at 80° F. Viscosity is a measure of the resistance of a fluid which is being deformed by either shear stress or extensional stress.

In an embodiment, a MEC of the type described herein displays a tunable compressibility. The compressibility of the MEC may be adjusted to some user and/or process desired value by adjustments of the amount of components, the nature of the components (e.g., salinity of the brine, type of brine, etc.) and temperature. One of ordinary skill in the art with the benefits of this disclosure may adjust the compressibility of a MEC as described herein by adjustments of any of the aforementioned factors.

In an embodiment, a method of servicing a wellbore comprises drilling a wellbore in a subterranean formation and introducing to the subterranean formation a wellbore servicing fluid. It is to be understood that "subterranean formation" encompasses both areas below exposed earth and areas below earth covered by water such as ocean or fresh water. In some embodiments, after drilling, the method further comprises running a casing in the wellbore and securing the casing into position against the subterranean formation using a sealant composition (e.g., cement).

In an embodiment, a MEC comprising brine, an oleaginous fluid, a surfactant, and optionally a co-surfactant is pumped into and resides in the annular space between a casing and a tubing wall, e.g., an annular space between a casing and a production tubing in a completed hydrocarbon production well. In an embodiment, a MEC of this disclosure is placed into the annular space between adjacent concentric strings of pipe extending into a wellbore. In an embodiment, a MEC of this disclosure is introduced into the bore of a cased wellbore. In some embodiments, MECs as packer fluids fill the annular column (e.g., tubing-casing annulus) located above a wellbore isolation device (e.g., a packer) to at or near the surface. In an embodiment, the MEC is solids free. In an embodiment, the components of the MEC do not polymerize under the conditions to which they are exposed. Alternatively, the MEC excludes polymers. In an embodiment, the MEC remains thermodynamically stable and does not separate during its service life in the wellbore (e.g., during the hydrocarbon production life of the well and/or between maintenance or workover cycles/intervals for the well).

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

Three MEC compositions comprising sodium bromide were prepared and the compressibility of the compositions evaluated. The compositions were designated samples 1-3. Sample 1 was prepared by contacting decyl amine oxide/octyl pyrrolidone at a 1/2 mole ratio (~50 vol-% water & 50 vol-% surfactant/co-surfactant) with 12.5 pounds per gallon (ppg) sodium bromide to obtain a 10.5 ppg mixture. Diesel was then added to this mixture up to its solubility limit (~15 vol-%) resulting in a final density of 10.0 ppg.

Sample 2 was prepared by contacting dodecylamidopropyl betaine/butanol at a 1/5 mole ratio (~50 vol-% water & 50 vol-% surfactant/co-surfactant) with 12.5 ppg sodium bromide to obtain a 10.5 ppg mixture. Diesel was then added to this mixture up to its solubility limit (~15 vol-%) resulting in a final density of 10.0 ppg.

Sample 3 was prepared by contacting dodecyl amine oxide/butanol at a 1/4 mole ratio (~50 vol-% water & 50 vol-% surfactant/co-surfactant) with 12.5 ppg sodium bromide to obtain a 10.5 ppg mixture. Diesel was then added to this mixture up to its solubility limit (~19 vol-%) resulting in a final density of 9.9 ppg.

The compressibility of Samples 1-3 was determined as described previously herein. The results are presented in FIG. 1. The compressibility of water is also shown for comparison. FIG. 1 illustrates the estimated compressibility from mixing the water containing surfactant compositions with diesel (Samples 1-3) at the volume fractions experimentally obtained. Theoretically, with large amounts of surfactants present in the solution, the compressibility of Samples 1-3 may be even higher and the values reflected below are the minimum compressibility increases. The results demonstrate that the addition of a relatively low volume of diesel (<20 volume-%) afforded up to a ~13% increase in the compressibility of the samples.

Example 2

Figure 2:
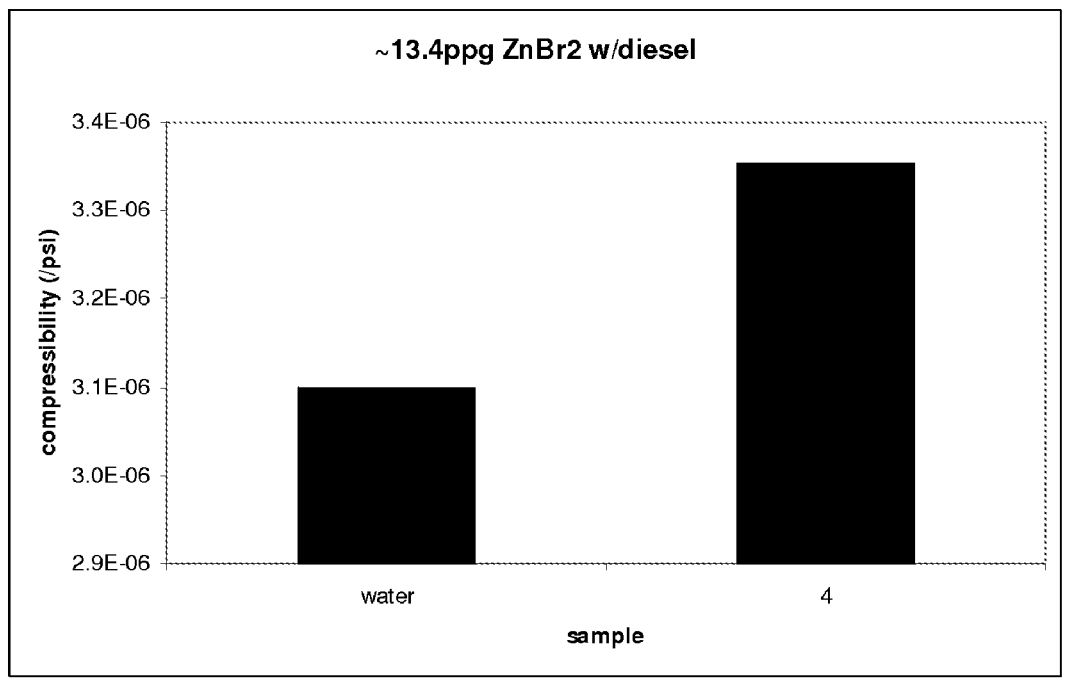
FIG. 2 is a graph of the compressibility of the samples containing zinc bromide from Example 2.

A MEC composition comprising zinc bromide, designated Sample 4, was prepared and the compressibility of the composition evaluated. Sample 4 was prepared by contacting cetyl trimethylammonium chloride/butanol at a 1/6 mole ratio (~50 vol-% water & 50 vol-% surfactant/co-surfactant) with 19.2 ppg zinc bromide to obtain a 13.8 ppg mixture. Diesel was then added to this mixture up to its solubility limit (~13 vol-%) resulting in a final density of 13.4 ppg. FIG. 2 presents the estimated compressibility of Sample 4 at the volume fractions experimentally obtained. The compressibility of water is also shown for comparison. Theoretically, with large amounts of surfactants present in the solution, the compressibility of Sample 4 may be even higher and the values reflected below are the minimum compressibility increases. The results demonstrate that the addition of a relatively low volume of diesel (<15 volume-%) afforded up to an ~8% increase in the compressibility of the sample.

Example 3

Figure 3:
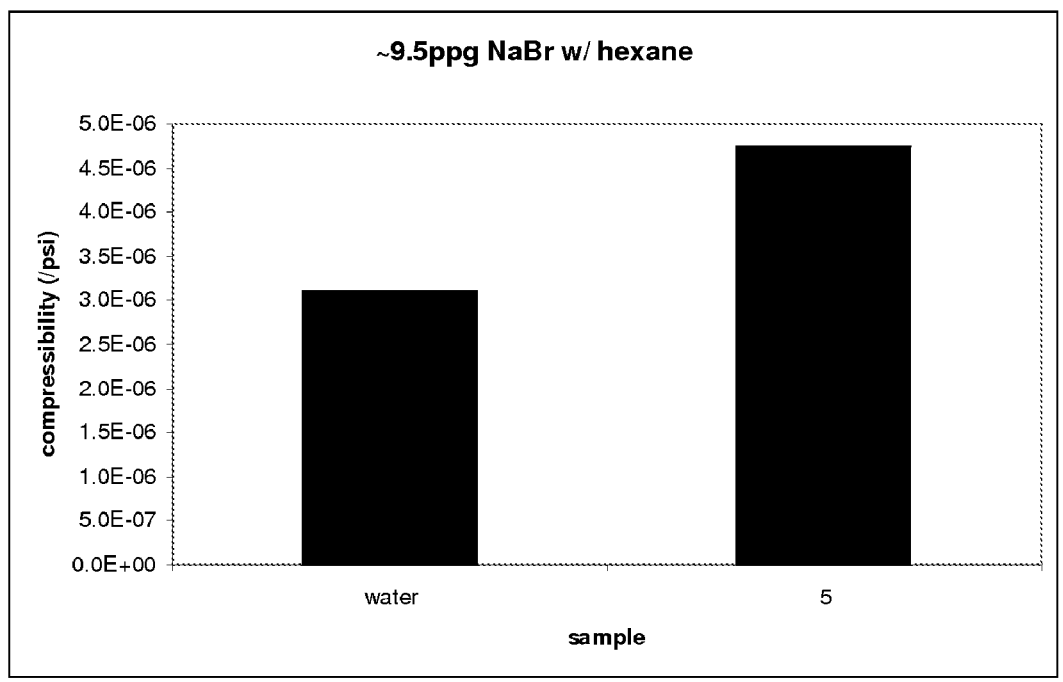
FIG. 3 is a graph of the compressibility of the samples containing sodium bromide from Example 3.

A MEC composition comprising the organic solvent hexane, designated Sample 5, was prepared and the compressibility of the composition evaluated. Sample 5 was prepared by mixing dodecylamidopropyl betaine/butanol at a 1/5 mole ratio (~50 vol-% water & 50 vol-% surfactant/co-surfactant) with 12.5 ppg sodium bromide to obtain a 10.5 ppg mixture. Hexane was then added to this mixture up to its solubility limit (~22 vol-%) resulting in a final density of 9.5 ppg. FIG. 3 shows the estimated compressibility of Sample 5 at the volume fractions experimentally obtained. The compressibility of water is also shown for comparison. Theoretically, with large amounts of surfactants present in the solution, the compressibility of Sample 5 may be even higher and the values reflected below are the minimum compressibility increases. The addition of a relatively low volume hexane (<25 volume-%) afforded up to a ~53% increase in the compressibility of the sample.

Example 4

Figure 4:
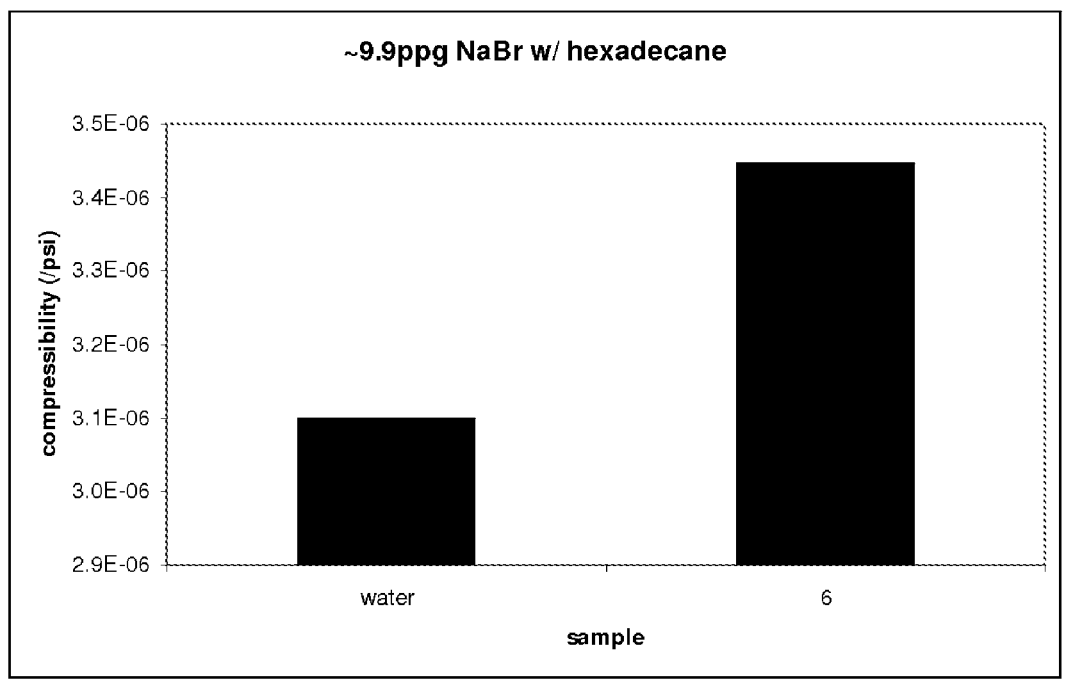
FIG. 4 is a graph of the compressibility of the samples containing sodium bromide from Example 4.

A MEC composition comprising the organic solvent hexadecane, designated Sample 6, was prepared and the compressibility of the composition evaluated. Sample 6 was prepared by mixing dodecylamidopropyl betaine/butanol at a 1/5 mole ratio (~50 vol-% water & 50 vol-% surfactant/co-surfactant) with 12.5 ppg sodium bromide to obtain a 10.5 ppg mixture. Hexadecane was then added to this mixture up to its solubility limit (~15 vol-%) resulting in a final density of 9.9 ppg. FIG. 4 shows the estimated compressibility of Sample 6 at the volume fractions experimentally obtained. The compressibility of water is also shown for comparison. Theoretically, with large amounts of surfactants present in the solution, the compressibility of Sample 6 may be even higher and the values reflected below are the minimum compressibility increases. The addition of a relatively low volume hexadecane (~15 volume-%) afforded up to a ~11% increase in the compressibility of the sample.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Also, the terms in the claims have their plain, ordinary meaning unless otherwise explicitly and clearly defined by the patentee.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising placing a composition comprising a surfactant wherein the surfactant is present in the composition in an amount of from about 15 wt. % to about 80 wt. % based on the total weight of the composition, brine, an oleaginous fluid, a viscosifier, and optionally a co-surfactant in an annular space of the wellbore, wherein the composition forms a microemulsion under low shear conditions and wherein the composition has a dynamic viscosity at 80° F. of from about 0.05 Pa·s to about 10 E6 Pa·s.

2. The method of claim 1 wherein the surfactant is selected from the group consisting of cationic surfactant, anionic surfactants, zwitterionic surfactants, non-ionic surfactants, and combinations thereof.

3. The method of claim 2 wherein the cationic surfactant comprises quaternary ammonium salt, ethoxylated quaternary ammonium salts, amine oxides, or a combination thereof.

4. The method of claim 2 wherein the cationic surfactant comprises stearyltrimethylammonium chloride, cetyltrimethylammonium tosylate, octyltrimethylammonium chloride, erucyl bis-(hydroxyethyl)methylammonium chloride, erucyl trimethylammonium chloride cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, or a combination thereof.

5. The method of claim 2 wherein the anionic surfactant has a carbon chain length of from about 8 to about 24.

6. The method of claim 2 wherein the anionic surfactant comprises alkali salts of acids, alkali salts of fatty acids, alkaline salts of acids, sodium salts of acid, sodium salts of fatty acid, alkyl sulphates, alkyl ethoxylate, sulphates, sulfonates, soaps, or a combination thereof.

7. The method of claim 2 wherein the anionic surfactant comprises sodium oleate, sodium dodecylbenzenesulfonate, sodium decanoate, sodium octyl sulfate, sodium caprylate sodium stearate, sodium myristate, sodium laurate, sodium cetyl sulfate, sodium myristyl sulfate, sodium lauryl sulfate, sodium decyl sulfate, or a combination thereof.

8. The method of claim 2 wherein the zwitterionic surfactant comprises alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, or a combination thereof.

9. The method of claim 8 wherein the alkyl betaine comprises laurylamidopropyl betaine, decyl betaine, dodecyl betaine, or a combination thereof.

10. The method of claim 8 wherein the alkyl amine oxide comprises decylamine oxide, dodecylamine oxide, tetradecylamine oxide, or a combination thereof.

11. The method of claim 8 wherein the phospholipid comprises lecithin, phosphatidyl choline, derivatives thereof, or a combination thereof.

12. The method of claim 2 wherein the brine is an aqueous solution comprising halide containing salts, alkali metal salts, alkaline metal salts, formate-containing compounds, sodium bromide (NaBr), calcium chloride (CaCl2), calcium bromide (CaBr2), sodium chloride (NaCl), zinc bromide (ZnBr2), ethyl formate, sodium formate, cesium formate, potassium formate, methyl formate, methyl chloro formate, triethyl orthoformate, trimethyl orthoformate, derivatives thereof, or combinations thereof.

13. The method of claim 2 wherein the brine has a density of from about 8.5 ppg to about 19.2 ppg.

14. The method of claim 2 wherein the co-surfactant comprises alkyl alcohols, alkyl acetate, alkyl pyrollidone, alkyl ketone, acryl amide, or a combination thereof.

15. The method of claim 14 wherein the alkyl alcohol comprises methanol, ethanol, propanol, butanol, or a combination thereof.

16. The method of claim 14 wherein the alkyl pyrollidone comprises n-octyl-2-pyrollidone, n-methyl pyrollidone, or a combination thereof.

17. The method of claim 1 wherein the brine is present in an amount of from about 10 wt. % to about 98 wt. % based on the total weight of the composition.

18. The method of claim 1 wherein the oleaginous fluid comprises a hydrocarbon, olefin, internal olefin based oil, mineral oil, kerosene, diesel oil, fuel oil, synthetic oil, linear or branched paraffin, ester, acetal, mixtures of crude oil, a derivative thereof, or a combination thereof.

19. The method of claim 1 wherein the oleaginous fluid is present in an amount of from 1 wt. % to about 90 wt. % based on the total weight of the composition.

20. The method of claim 1 wherein the co-surfactant is hydrophobic and does not self-aggregate.

21. The method of claim 1 wherein the co-surfactant is present in an amount of from about 0.5 wt. % to about 90 wt. % based on the total weight of the composition.

22. The method of claim 1 wherein the composition has a compressibility of from about $3.2\text{E-}6 \text{ psi}^{-1}$ to about $1.5\text{ E-}5 \text{ psi}^{-1}$.

23. The method of claim 1 wherein the composition has a thermal stability at a temperature ranging from 65° F. to 400° F. for a time period of from about 1 hour to about 30 days.

24. The method of claim 1 wherein the annular space comprises the space between a casing and tubing, adjacent concentric strings of pipe within a wellbore, or combinations thereof.

25. The method of claim 1 wherein the composition is solids free.

26. The method of claim 1 wherein the composition fills an annular column formed by a casing and a production tubing and located above an isolation device and extending upward to at or near the surface of the wellbore.

* * * * *